United States Patent [19]
Zeek et al.

[11] 3,743,008
[45] July 3, 1973

[54] REGENERATOR SEAL
[75] Inventors: Richard M. Zeek, Farmington; Adolf Hetke, Livonia, both of Mich.
[73] Assignee: General Motors Corporation, Detroit, Mich.
[22] Filed: Jan. 4, 1971
[21] Appl. No.: 103,599

[52] U.S. Cl. ............ 165/9, 277/96, 277/235 A, 117/93.1 PF, 219/76, 219/121 P, 219/137
[51] Int. Cl. ............................................. F28d 19/00
[58] Field of Search ............ 165/9; 277/96, 235 A; 219/76, 121 P, 137; 117/93.1 PF

[56] References Cited
UNITED STATES PATENTS

| | | | |
|---|---|---|---|
| 2,005,897 | 6/1935 | Knowles | 117/93.1 PF |
| 3,640,755 | 2/1972 | Barth | 117/93.1 PF X |
| 3,364,548 | 1/1968 | Marco | 29/157.3 R |
| 3,204,969 | 9/1965 | Williams | 165/9 X |
| 1,223,777 | 4/1917 | Eby | 219/137 X |
| 3,601,182 | 8/1971 | Rao et al. | 165/9 |
| 3,534,808 | 10/1970 | Carroll | 165/9 |
| 1,804,837 | 5/1931 | Lunn | 219/137 |

Primary Examiner—Albert W. Davis, Jr.
Attorney—Jean L. Carpenter and Arthur N. Krein

[57] ABSTRACT

A regenerator seal structure for a rotary regenerator in which the wear seal element of graphite or other suitable material is plasma spray bonded to a support structure such as a seal support platform or the matrix of the generator.

4 Claims, 6 Drawing Figures

PATENTED JUL 3 1973 3,743,008

INVENTORS
Richard M. Zeek &
BY       Adolf Hetke
Arthur N. Krein
ATTORNEY

REGENERATOR SEAL

This invention relates to seals for rotary regenerators and, in particular, to a seal structure in which the wear element of the seal structure is plasma spray bonded to its support structure.

Rotary regenerators, particularly those of the axial flow type, utilize a porous metal or ceramic disc which is rotated so that each element thereof passes successfully through two aeriform fluid flow paths, absorbing heat from a hotter fluid and releasing it to a cooler fluid in these flow paths.

One application of such regenerators is in preheating the combustion air in gas turbine engines. In such an application, there is a large pressure difference between the compressed air which is heated and the turbine exhaust gases which give up heat. In order to prevent leakage of the high pressure fluid into the low pressure fluid path and also to prevent each fluid from bypassing the matrix, seals are provided which extend around the perimeter of one or both flow paths on each face of the regenerator, bridging the gap between the regenerator disc and a face of the enclosing member which is proximate to the matrix.

Because of the very high temperatures at which such a regenerator must operate when employed with gas turbines, the provision of an adequate, durable and economically practicable seal has presented difficult problems. In current regenerator seal structures used with gas turbine engines, the actual sealing element is normally made of a suitable wear material such as graphite or a graphite composition suited to the requirements of the installation.

These graphite seals in the form of seal wear segments are secured to a suitable support platform, made for example of steel. One method of securing these seal wear elements to the platform is by bonding them thereto with silicone rubber, one of the best high temperature adhesives and sealants available. However, the use of silicone rubber for such applications is limited as the required operational temperatures often exceed the capability of the silicone rubber. A second but more costly method of attaching these wear segments involves the use of countersunk screws or rivets to secure these wear segments to the support platform. The use of such fasteners, however, has several disadvantages, such as the precise location of the multitude of holes to accept the fasteners is expensive and secondly, because high stress concentrations occur in these wear elements at the countersunk hole locations causing cracks in the graphite or similar materials normally used to fabricate these wear elements.

It is, therefore, the primary object of this invention to improve regenerator seal structures whereby the wear element of the seal structure is secured to its support platform by plasma spray bonding.

Another object of this invention is to improve regenerator seal structures whereby a plasma coating is used to provide for retention of a wear element to its support platform and to provide a seal between this wear element and its support platform.

These and other objects of the invention are attained by applying a plasma coating material to retain a wear seal element, such as a graphite segment, to retain it on a support platform.

For a better understanding of the invention, as well as other objects and further features thereof, reference is had to the following detailed description of the invention to be read in connection with the accompanying drawings, wherein.

Figure 1:
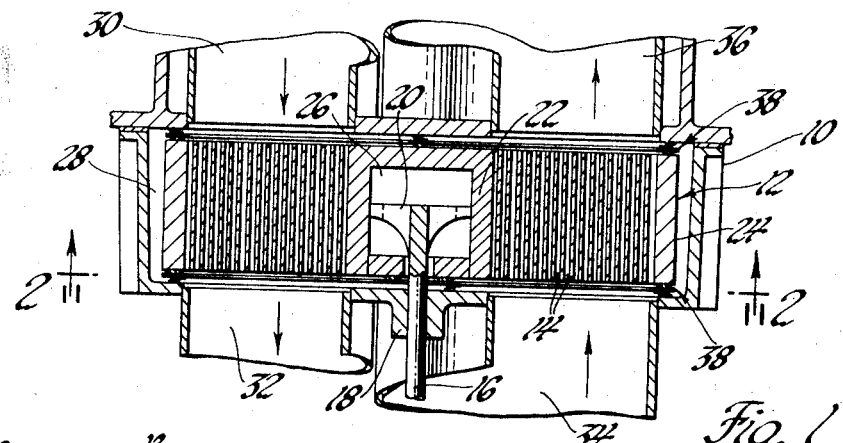
FIG. 1 is a schematic view of the rotary regenerator taken in a plane containing the axis of rotation of the matrix.

Referring now to FIG. 1, the rotary regenerator includes a housing 10 which is generally drum-shaped and which encloses an annular foraminous matrix 12 which is of such construction so as to define a multiplicity of pores or passages 14 (greatly enlarged in FIG. 1), extending from face to face of the matrix generally parallel to the axis of rotation defined by a matrix locating and driving shaft 16. Shaft 16 is suitably journaled in a boss 18 of the housing 10 and terminates in a spider 20 which is coupled to the matrix by means, not illustrated, which may be of the type described in U.S. Pat. No. 3,476,173 issued Nov. 4, 1969, to Joseph W. Bracken, Jr., and William S. Hubble, so that the matrix may be rotated slowly.

The matrix preferably includes a nonporous inner rim 22 and an outer nonporous rim 24, but such rims are not essential. A generally cylindrical space 26 is defined within the interior of the matrix and a space 28 extends around the periphery of the matrix within the housing 10.

An inlet 30 for cool high pressure air enters one face of the housing and, opposite to it, an outlet 32 is provided for the discharge of compressed air which is heated after having passed through the matrix. Hot low pressure exhaust gases enter through an inlet 34 and leave the regenerator through an outlet 36, the two streams being thus in counterflow relation in the embodiment of the regenerator illustrated. As shown, the hot gas passage is of larger area than the cool air passage because of the difference in density between these fluids.

A sealing means or seal assembly 38 is provided between each face of the matrix and the housing to confine the cold and hot fluids to the desired flow paths through the matrix from inlet to outlet and to minimize leakage between the paths. As shown more clearly in FIG. 2, such a seal comprises two arms 40 and 42 extending radially of the matrix face preferably joined at the center of the matrix and joined at the outer rim of the matrix by an acute rim or bypass seal 44 extending around the high pressure path and an arcuate rim seal 46 extending around the low pressure path. The seal assembly thus defines an opening 49 for the heated high pressure air and an opening 50 for the hot low pressure exhaust gases, these openings as shown in FIG.

2 conforming generally to the outline of the ducts 32 and 34, respectively.

The seal arms 40 and 42 together may be termed a cross arm seal lying between the high pressure and low pressure fluid paths and, the seal portions 44 and 46 may be termed a rim seal or bypass seal, these being engaged with the matrix adjacent to its periphery. The rim seal 44 and the cross arm seal surround the high pressure passage and the cross arm seal and rim seal portion 46 surround the low pressure gas passage.

Figure 2:
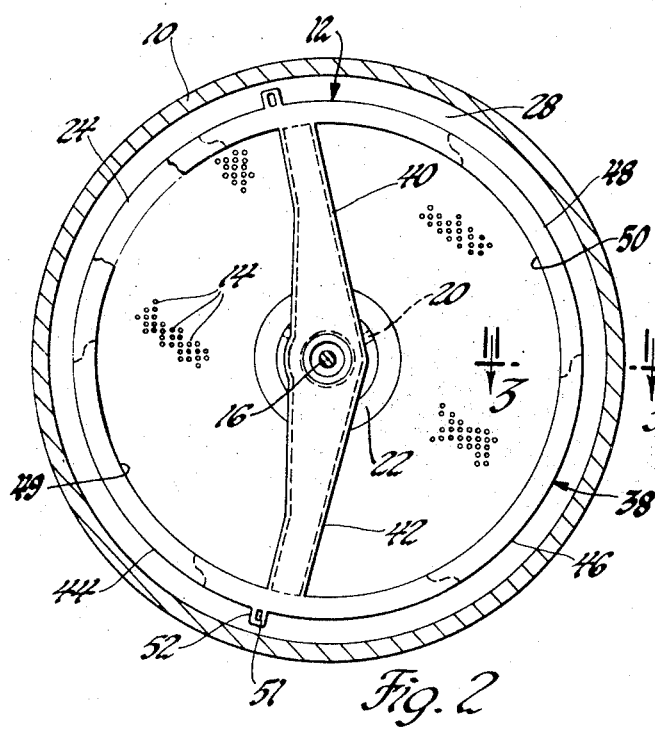
FIG. 2 is a sectional view taken along line 2—2 of FIG. 1 illustrating one of the seals of the regenerator of FIG. 1, the seal being constructed in accordance with the invention.
Figure 3:
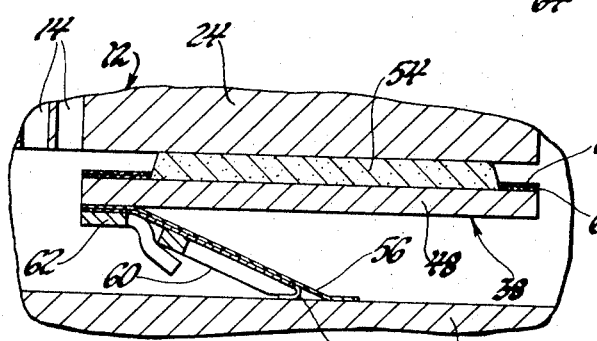
FIG. 3 is an enlarged sectional view taken along 3—3 of FIG. 2 illustrating one embodiment of the regenerator seal structure of the invention.

With reference to FIGS. 2 and 3, this seal structure includes a support platform or carrier 48 which, in the embodiment illustrated, consists of a circular rim portion forming the base part of the rim seals 44 and 46 and an angular apertured cross arm portion forming the base part of cross arm seal portions 40 and 42. Preferably, this is a unitary structure of heavy sheet metal so that it is rigid in the direction normal to the axis of rotation of the matrix but is capable of flexing to a certain extent to the direction parallel to the axis of rotation of the matrix. This support platform or carrier 48 is located positively against rotation and transitory movement transverse to the axis of rotation, but is free to move parallel to the axis of rotation of the matrix. This mounting arrangement is provided by a number of pins or dowels, not shown, projecting from the fixed structure of the housing 10 into slots 51 in lugs 52 extending radially outward from the frame 48 as seen in FIG. 2.

The support platform or carrier 48 supports the seal wear elements, generally designated 54, secured to the platform in a manner to be described. These seal wear elements are the elements which make actual contact with the matrix through the circumference of the rim seals and along the length of the cross arm seals. These wear elements are composed of a material or materials suited to the requirements of the installation and, in the embodiment illustrated, are formed from graphite or a graphite composition, as is well known in the art.

The carrier 48 and the wear elements 54 secured thereto in a manner to be described may be supported within the housing 10, as shown in FIG. 3, by a secondary seal structure, of the type disclosed in copending U.S. Pat. application Ser. No. 769,928 filed Oct. 23, 1968, now U.S. Pat. No. 3,542,122, in the name of Joseph W. Bracken, Jr., (of common ownership with this application), which includes a sealing member 56, a supporting member 58, a support plate 60 and a hinge element or abutment strip 62, with the sealing member 56, supporting member 58 and hinge element 62 welded together and to the support carrier 48.

Figure 5:
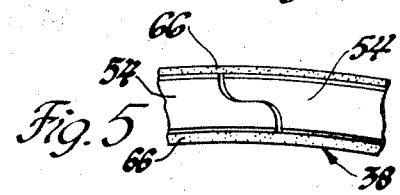
FIG. 5 is an enlarged view of a portion of the seal structure illustrating the joint arrangement between two seal wear segments; and, FIG. 6 is a sectional view of a matrix structure having a seal wear element bonded thereto in accordance with the invention.

Referring again to FIG. 2, the wear elements 54 of this seal structure are formed as separate segments of the desired configuration so that when assembled to the support carrier they conform to the shape thereof. In the embodiment shown, six arcuate-shaped seal wear segments are secured to the circular rim portion of the support carrier 48 to form with the rim seals 44 and 46, while a single apertured seal wear element is secured to the apertured cross arm portion of the support carrier to form the cross arm seal portions 40 and 42. The ends of the arcuate-shaped wear segments are S-shaped with the sections joining the recurved portions of mating ends of a pair of segments being butted together in sealing engagement with each other, as shown in FIG. 5, and with a gap for expansion being provided between the mating recurve portions of adjoining segments. As shown in FIG. 5, the abutting end surfaces of the arcuate-shaped segments are not bonded to the support carrier.

In accordance with the invention, the individual wear segments 54 of this seal structure are fastened to the support carrier with a plasma coating which is bonded to the metal of the support carrier and overlaps a tapered edge of the wear segments. This plasma coating provides for retention of the wear segments on the support carrier and provides a seal between these wear segments and the support carrier.

To plasma spray bond the seal wear segments to the support carrier, the support carrier must first be cleaned as in a vapor degreasing system, as is well known, to remove all oil and other grease-type contaminants. After degreasing, the support carrier is glass tape masked in a manner so that only those areas that are to be sprayed are left exposed. In the glass masked condition, the support carrier is grit blasted with a suitable abrasive material, such as an 80 grit aluminum oxide ($Al_2O_3$). After being grit blasted, the support carrier is cleaned with a clean and dry air blast to remove all dust particles therefrom.

After it has been cleaned, the support carrier is then moved to and mounted onto a suitable plasma spray fixture after which the wear segments are placed into their appropriate positions. The wear segments are then retained and clamped against the support carrier such that, for example, the inside seal perimeter only is exposed to receive the plasma spray. The next step is to then plasma spray the exposed area, the inside seal perimeter in this example, with a thin layer bond coat 64, such as with a nickel aluminide bond material, for example Metco 450 (4.5 percent Aluminum, Blanace Nickel) flame spray powder manufactured by Metco, Inc., Westbury, Long Island, N.Y. After bond coating, a nickel graphite composite powder (75 Ni–25C) for example, is plasma sprayed over the bond coating to form a plasma retaining coat 66 which abuts against the side of the seal wear segment, as seen in FIG. 3. After this, the outside seal perimeter is exposed and then the last two steps described above are again repeated in the same sequence on the outside seal perimeter. Any overspray is then cleaned, if desired, and this composite seal structure is now ready for use in a rotary regenerator.

Figure 4:
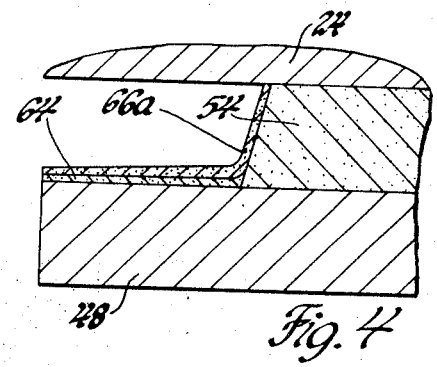
FIG. 4 is a segment of an enlarged view of a portion of FIG. 3 illustrating another embodiment of the seal structure of the invention.

However, if a suitable wear material, such as the nickel coated graphite powder described above, is used to effect bonding, the plasma retaining coat can alternatively extend up the side of the seal wear segment to provide a plasma retaining coat 66a, as seen in FIG. 4, since it will not harm the matrix 12. The use of such a suitable wear material for the plasma retaining coat eliminates the requirement for any clean-up of overspray or special masking prior to coating.

Figure 6:
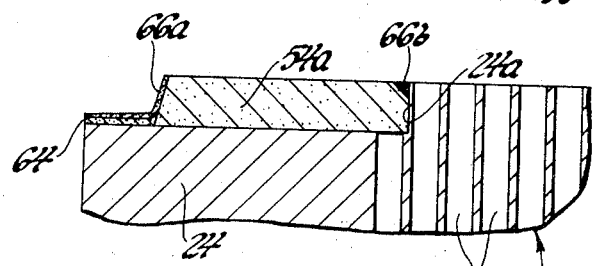

Thus, in a further embodiment as illustrated in FIG. 6, a seal wear element 54a can be secured by a bond coat 64 and plasma retaining coat 66a directly to the outer rim 24 portion of the matrix 12 which is provided with an annular groove or stepped portion 24a on each face thereof to receive the seal wear elements with a further plasma retaining coat 66b applied in the notched butt joint between the seal wear element 54a and stepped portion 24a of the matrix 12. In this embodiment, the seal wear element 54a would then be positioned to contact the seal structure, previously described, preferably contact being made with the seal wear elements 54 thereon.

Although preferred coating materials have been described above, it should be realized that various other materials, suitable for plasma spraying, may be used combining such properties as matching of expansion coefficients, bonding ability and strength as desired for the intended application.

The advantages in the use of plasma spray bonding of the seal wear segments to the desired support platform are low cost since no precise machining for fasteners is required in either the seal wear elements or in the support platform, the plasma spray bond is not effected by the normal operating temperatures in the regenerator and, relatively thin seal wear segments may be used since no additional thickness allowance need be required for countersunk fasteners or mounting brackets. For example, in regard to the last mentioned advantage, in one embodiment of a seal structure in accordance with the invention, the support carrier 48 is about 0.06 inch thick, the seal wear segments are about 0.06 inch thick, the bond coat 64 is not more than 0.002 inch thick and, the plasma retaining coat 66 is not more than 0.030 inch and not less than 0.015 inch thick, although these thicknesses are greatly exaggerated in the drawings for purpose of illustration only.

What is claimed is:

1. A rotary regenerator comprising a housing defining two flow paths respectively for fluids at different pressures, means defining a fluid inlet to and a fluid outlet from the housing for each flow path, a heat exchange matrix mounted in the housing so as to extend across both flow paths, the matrix being pervious to fluid flow and being adapted to transfer heat between the fluids, means for rotating the matrix about an axis so that portions of the matrix are alternately heated by one fluid and cooled by the other fluid, and sealing means positioned between the housing and the matrix to confine each fluid to its flow path; the sealing means each comprising a support platform having a circular rim portion conforming to said matrix and a cross arm portion connected at opposite ends to said circular rim portion to form therewith two flow paths complementary with the flow paths in said housing, seal wear means positioned on said support platform and, plasma spray bond material secured to said support platform and to said seal wear means to bond and seal said seal wear means to said support platform.

2. A rotary regenerator according to claim 1 wherein said matrix includes an annular groove on each face thereof, seal wear means positioned in said annular groove for engagement with said seal wear means on said circular rim portion of said support platform and, spray-bond material secured to said matrix and to the edges of said seal wear means to bond and seal said seal wear means to said matrix.

3. A rotary regenerator according to claim 1 wherein said plasma-spray material includes a layer of bond coat material against said support platform and a layer of plasma retaining material over said layer of bond coat material.

4. A rotary regenerator according to claim 3 wherein said layer of bond coat material is a nickel aluminide material and said layer of plasma retaining material is a nickel 75 percent graphite 25 percent material.

* * * * *